United States Patent
Maiworm et al.

(10) Patent No.: US 11,149,229 B2
(45) Date of Patent: Oct. 19, 2021

(54) OIL PROCESSING

(71) Applicant: Cargill, Incorporated, Wayzata, MN (US)

(72) Inventors: Michael Maiworm, Hamburg (DE); Armin Willem-Friedrich Hermann Tarnow, Rotterdam (NE)

(73) Assignee: Cargill, Incorporated, Wayzata, MN (US)

( * ) Notice: Subject to any disclaimer, the term of this patent is extended or adjusted under 35 U.S.C. 154(b) by 0 days.

(21) Appl. No.: 16/969,643

(22) PCT Filed: Feb. 21, 2019

(86) PCT No.: PCT/US2019/018957
§ 371 (c)(1),
(2) Date: Aug. 13, 2020

(87) PCT Pub. No.: WO2019/165072
PCT Pub. Date: Aug. 29, 2019

(65) Prior Publication Data
US 2020/0399557 A1  Dec. 24, 2020

(30) Foreign Application Priority Data

Feb. 21, 2018  (EP) .................................... 18157904
Jul. 18, 2018  (EP) .................................... 18184132
Aug. 3, 2018  (EP) .................................... 18187289

(51) Int. Cl.
*C11B 3/00* (2006.01)
*B01D 3/10* (2006.01)
*C11B 3/06* (2006.01)
*C11B 3/10* (2006.01)
*C11B 3/14* (2006.01)
*C11B 3/12* (2006.01)
*B01D 3/28* (2006.01)

(52) U.S. Cl.
CPC ................ *C11B 3/001* (2013.01); *B01D 3/10* (2013.01); *C11B 3/06* (2013.01); *C11B 3/10* (2013.01); *C11B 3/12* (2013.01); *C11B 3/14* (2013.01); *B01D 3/28* (2013.01)

(58) Field of Classification Search
CPC ... C11B 3/001; C11B 3/20; C11B 3/14; C11B 3/06; C11B 3/10; C11B 3/12; B01D 3/10; B01D 3/28
See application file for complete search history.

(56) References Cited

U.S. PATENT DOCUMENTS 2,905,596 A * 9/1959 Findlay .................... B01D 3/14
                                                     203/72
4,378,317 A * 3/1983 Seguine .................... B01D 3/10
                                                     554/205
4,789,554 A * 12/1988 Scavone .................... B01D 3/38
                                                     426/417

FOREIGN PATENT DOCUMENTS

| EP | 0866843 | B1 | 10/2001 | |
|----|---------|----|---------|---|
| EP | 1905816 | B1 | 8/2015 | |
| EP | 3321348 | A1 * | 5/2018 | ............... C11B 3/04 |
| EP | 3330609 | A1 | 6/2018 | |
| EP | 3321348 | B1 | 12/2019 | |
| GB | 816522 | A | 7/1959 | |
| WO | 2012107230 | W | 8/2012 | |
| WO | WO2019/038320 | A1 * | 2/2019 | ............... C11B 3/04 |
| WO | WO2019/165065 | * | 8/2019 | ............... C11B 3/14 |

OTHER PUBLICATIONS

Loft S C ED—Koseoglu Semih Sefa et al.: Deodorization—Theory and Practice, Jan. 1, 1989, Advances in Oils and Fats, Antioxidants, and Oilseed By-Prod, Champaign, Ill. : AOCS Press US, pp. 117-122, XP008134203.

* cited by examiner

*Primary Examiner* — Yate' K Cutliff

(57) ABSTRACT

A process for the production of a refined oil having a reduced content of glycidyl esters and hydroperoxides characterized in that it comprises subjecting an edible oil to the following steps, a bleaching step, a deodorization step, re-bleaching step on the deodorized oil, and a further refining step, wherein the further refining step is carried out by passing the bleached edible oil obtained in step c) through an oil refining equipment consisting of a stripping column with packing and not more than one oil collection tray.

18 Claims, No Drawings

OIL PROCESSING

CROSS REFERENCE TO RELATED APPLICATIONS

This application is a national phase application of PCT/US2019/018957, filed 21 Feb. 2019, entitled OIL PROCESSING, which claims the benefit of priority to European Provisional Application No. 18157904.6, filed 21 Feb. 2018, entitled OIL PROCESSING and European Provisional Application No. 18184132.1, filed 18 Jul. 2018, entitled OIL PROCESSING, and European Provisional Application No. 18187289.1, filed 3 Aug. 2018, entitled OIL PROCESSING, which are hereby incorporated by reference in their entirety.

FIELD OF THE INVENTION

The present invention relates to a novel process for producing refined oils very low in glycidyl ester content and low peroxide value.

BACKGROUND OF THE INVENTION

Crude oils, as extracted from their original source, are not suitable for human consumption due the presence of impurities—such as free fatty acids, phosphatides, metals and pigments—which may be harmful or may cause an undesirable colour, odour or taste. Crude oils are therefore refined before use. The refining process typically consists of three major steps: degumming, bleaching and deodorizing. An oil obtained after completion of the refining process (called a "refined oil") is normally considered suitable for human consumption and may therefore be used in the production of any number of foods and beverages.

Unfortunately, it has now been found that the refining process itself contributes to the introduction, into the refined oil, of high levels of 3-monochloropropane-1,2-diol fatty acid esters (3-MCPD esters), 2-chloro-1,3-propanediol fatty acid esters (2-MCPD esters) and glycidyl esters (GE). 3-MCPD esters, 2-MCPD esters and glycidyl esters are produced as a result of the oils being exposed to high temperatures during processing, in particular during deodorization.

A lot has been discussed and described in order to understand the mechanism of the formation, mitigation and reduction of 2- and 3-MCPD fatty acid esters and glycidyl esters.

WO2012/107230 describes a process for obtaining a refined oil compositing having a reduced 3-MCPD ester and/or glycidyl ester content.

EP 3 321 348 further describes a process for refining vegetable oil with suppression of unwanted impurities.

There is still a need in the industry to identify an efficient and effective method of producing refined oils with an acceptable taste and with very low 2- and 3-MCPD ester and/or glycidyl ester levels. The present invention provides such a process.

SUMMARY OF THE INVENTION

According to a first aspect of the present invention, there is provided a process for the production of a refined oil having a reduced content of glycidyl ester and hydroperoxides characterized in that it comprises subjecting an edible oil to the following steps:
  a. a bleaching step,
  b. a deodorization step,
  c. a re-bleaching step of the deodorized oil, and
  d. a further refining step, wherein the further refining step (d) is carried out by passing the bleached edible oil obtained in step c) under vacuum through an oil refining equipment consisting of a stripping column with packing and not more than one oil collection tray.

According to a further aspect of the present invention, there is provided the use of refining equipment consisting of a stripping column with packing and not more than one oil collection tray to reduce the content of hydroperoxides and/or volatiles from refined bleached, deodorized and re-bleached edible oils.

DETAILED DESCRIPTION

The present invention provides a process for the production of refined oils having a reduced content of glycidyl ester and hydroperoxides.

It provides for a process for the production of a refined oil having a reduced content of glycidyl ester and low peroxide value characterized in that it comprises subjecting an edible oil to the following steps:
  a. a bleaching step,
  b. a deodorization step,
  c. a re-bleaching step of the deodorized oil, and
  d. a further refining step, wherein the further refining step (d) is carried out by passing the bleached edible oil obtained in step c) under vacuum through an oil refining equipment consisting of a stripping column with packing and not more than one oil collection tray.

The "oil refining equipment consisting of a stripping column with packing and not more than one oil collection tray" used in step d), indicates that the refining ability of the refining equipment is obtained from the use of the stripping column and not more than one oil collection tray. It is to be understood that in order to operate the refining equipment, valves, pumps, heat exchangers (heating and/or cooling of the oil), and the like, are needed. An in-line heater may be used before the stripping column.

The "not more than one" oil collection tray is a range covering "up to one" collection tray, and thus including also no collection tray.

In an aspect of the present invention where one collection tray is present, it is meant to collect the oil that drops down from the packing by gravity and makes it available for pumps that transport the oil. No process and/or quality changes are performed in the collection tray. The only purpose of the collection tray is a collection and/or accumulation of oil for hold-up purposes. There are no chemical and/or physical changes in the quality of the oil while residing in the collection tray. A refining equipment with no collection tray is suitable as well. In absence of a collection tray, the oil will be directly transported without collection. The oil is cooled down by applying a heat exchanger. There is no need for mixing of the oil with a quenching oil.

The equipment used in step d) is not containing retention trays. Retention trays, retention vessels, or compartments, also known as sections, are always present in standard deodorizer equipment known in the art, whether batch, continuous or semi-continuous deodorizer equipment. Batch, continuous or semi-continuous deodorizers are built of these different compartments, the retention trays. In each tray the oil is kept for a certain time at high temperature and steam is introduced into the oil. Long retention time of the oil is needed to obtain physical and chemical changes in the oil, obtained by forcing the oil from one tray to the next tray. Components such as amongst others, colour, flavour and/or flavour precursors are decomposed into volatile breakdown products which are then removed by steam passing through the oil in the retention trays. In order to obtain oils of acceptable to good quality, long retention (residence) times are required. However, these long residence times at high temperatures are known to be responsible for the formation of further unwanted process contaminants, such as chloropropanol esters (3-MCPD esters), glycidyl esters, trans fatty acids, and the like. Additionally, components present in the oil and which are known to be beneficial for the oxidation stability of the oil may be decomposed and the content of these components such as tocopherols, tocotrienols, and the like may be significantly reduced. These are amongst others good reasons to avoid long retention times at high temperatures.

Furthermore, these retention trays may add to the complexity of the known-in the art deodorizers and thus resulting in high investment costs. The retention trays retain high volumes of the oil in the equipment. Keeping such high volumes of oil at high temperature for a long time also may represent a significant energy cost. Switching from one to another edible oil is complicated and the risk of comingling is increased.

The refining equipment consisting of a stripping column with packing and one or no oil collection tray applied in step d) of the process of the present invention is not suffering from the previously outlined disadvantages.

The present invention provides a process for the production of a refined oil having a reduced content of components selected from 2- and 3-MCPD esters, glycidyl esters and mixtures of two or more thereof, characterized in that it comprises a bleaching step followed by a deodorization step and in that it comprises a mild final refining step, i.e. a re-bleaching and a further refining step d) carried out under conditions which will limit the formation of undesirable substances and which allow for short residence times in the stripping column and optionally including the pre-heating step. Without being bound by specific theories, it is recognized that components such as glycidyl esters will be removed in the re-bleaching step. However, this re-bleaching step may create off flavors and/or hydroperoxides and these created impurities will be removed in the subsequent further refining step d). The subsequent refining step d) is conducted such that further creation of process contaminants such as 3-MCPD esters, 2-MCPD esters, and/or glycidyl esters are kept to a minimum. Surprisingly, it has been found that by using the oil refining equipment in step d), a very efficient process is obtained. The hydroperoxides are removed at low temperature and/or in a very short residence time, while maintaining the content of process contaminants (2- and 3-MCPD esters, glycidyl esters and mixtures of two or more thereof) very low.

Additional Steps

In addition to the refining steps described above, the process of the present invention may include one or more additional refining or treatment steps. For example, the crude or partially refined oil may be subjected to one or more degumming steps. Any of a variety of degumming processes known in the art may be used. One such process (known as "water degumming") includes mixing water with the oil and separating the resulting mixture into an oil component and an oil-insoluble hydrated phosphatides component, sometimes referred to as "wet gum" or "wet lecithin". Alternatively, phosphatide content can be reduced (or further reduced) by other degumming processes, such as acid degumming (using citric or phosphoric acid for instance), enzymatic degumming (e.g., ENZYMAX from Lurgi) or chemical degumming (e.g., SUPERIUNI degumming from Unilever or TOP degumming from VandeMoortele/Dijkstra CS). If a degumming step is used, it will preferably precede the first bleaching step.

The process may also optionally include one or more neutralization steps (before the first bleaching), any kind of dewaxing (at any place in the process), fractionation (at any place in the process).

The process of the invention may also include one or more chemical or enzymatic modification steps, including for instance hydrogenation, alkali treatment and/or interesterification. Hydrogenation will preferably be performed before either the deodorization step (b) or the re-bleaching step (c). Chemical interesterification will preferably be performed after the deodorization step (b) and prior to the further refining step (d). If the oil being treated according to the present process has a relatively low FFA content, it may also be performed prior to the deodorization step (b). Enzymatic interesterification can be performed at any point in the process and will preferably be performed with a lipase enzyme. Advantageously, it has been found that when performed after the initial deodorization step (b), enzymatic interesterification could be used as an alternative to the re-bleaching step (c), or could be carried out at the same time, in the same process (e.g. batch wise or in a fixed bed column).

The process may also include—or indeed be preceded or followed by—one or more blending steps. It may be desirable, for instance, to blend oils of different types or from multiple sources. For example, a number of crude or partially refined oils could be blended before the first bleaching step. Alternatively, two or more refined oils could be blended after the final refining step or partially refined oils could be blended at an intermediate stage.

Many permutations and variations of the present process are possible. These will be apparent to a skilled person depending on the nature of the crude oil being used as a starting material and/or on the type of refined oil being produced and its desired end use. The only restriction that will be imposed is that the oil should not be subjected to any treatment steps, after the final mild refining (i.e. re-bleaching and refining step d)), which could significantly increase levels of 3-MCPD esters, 2-MCPD esters, and/or glycidyl esters in the oil beyond a target level.

According to one aspect of the invention, the process will comprise subjecting an oil to the following steps, in order: (a) a bleaching step, (b) a deodorization step, (c) a re-bleaching step, and (d) a further refining step, wherein the further refining step (d) is carried out by passing the bleached edible oil obtained in step c) through an oil refining equipment consisting of a stripping column with packing and not more than one oil collection tray. This further refining step d) is carried out at a temperature below 215° C., below 210° C., below 200° C., below 190° C., below 185° C., below 180° C., between 130-210° C., between 150-175° C., from 160 to 180° C.

Bleaching

In general, bleaching is a process whereby impurities are removed to improve the color and flavor of the oil. It is typically performed prior to deodorization. The nature of the bleaching step will depend, at least in part, on the nature and quality of the oil being bleached. Generally, a crude or partially refined oil will be mixed with a bleaching agent which combines with oxidation products (e.g. peroxides), trace phosphatides, trace soaps, pigments and other compounds to enable their removal. The nature of the bleaching agent can be selected to match the nature of the crude or partially refined oil to yield a desirable bleached oil. Bleaching agents generally include natural or "activated" bleaching clays, also referred to as "bleaching earths", activated carbon and various silicates. In one aspect of the invention, the bleaching step a) and/or c) is performed in presence of an activated bleaching agent. Activated bleaching agent refers to acid and/or physically activated (e.g. by thermal treatment). Activation includes the increase of the surface in order to improve the bleaching efficiency. A skilled person will be able to select a suitable bleaching agent from those that are commercially available based on the oil being refined and the desired end use of that oil.

The processes of the present invention will include at least two bleaching steps. The bleaching step and the re-bleaching step may be the same or similar (e.g. with the same bleaching agents and performed under similar conditions)—the re-bleaching step could even be more intensive than the preceding one(s). Alternatively, the re-bleaching step will be a mild bleaching step, i.e. less intensive than the preceding one(s). For example, the re-bleaching step may be performed with less bleaching agent (or less active bleaching agent), at lower temperatures and/or with a reduced retention time, or in bleaching equipment that will have less impact on taste and free fatty acid formation (i.e. in an oxygen-poor environment). An oxygen-poor environment will be understood as an environment or set-up capable of significantly reducing the oil's contact with oxygen. The re-bleaching step may, for instance, be performed in an inert gas and/or under vacuum (e.g. under nitrogen atmosphere) or in a fixed bed column.

Preferably, the re-bleaching step will be performed at a temperature of from 70° C. to 140° C., for example from 80° C. to 110° C.

These bleaching steps can be suitable to reduce and/or remove 2-MCPD esters, 3-MCPD esters, glycidyl esters and mixtures of two or more thereof.

Deodorization

Deodorization is a process whereby free fatty acids (FFAs) and other volatile impurities are removed by treating (or "stripping") a crude or partially refined oil under vacuum with steam, nitrogen or other gasses. The deodorization process and its many variations and manipulations are well known in the art and the deodorization step of the present invention may be based on a single variation or on multiple variations thereof.

For instance, deodorizers may be selected from any of a wide variety of commercially available systems, including both multi-chamber deodorizers (such as those sold by Krupp of Hamburg, Germany; De Smet Group, S.A. of Brussels, Belgium; Gianazza Technology s.r.l. of Legnano, Italy; Alfa Laval AB of Lund, Sweden, or others) and multi-tray deodorizers (such as those sold by Krupp, DeSmet Group, S.A., and Crown Ironworks of the United States).

Deodorization is typically carried out at elevated temperatures and reduced pressure to better volatilize the FFAs and other impurities. The precise temperature and pressure may vary depending on the nature and quality of the oil being processed. The pressure, for instance, will preferably be no greater than 10 mm Hg but certain aspects of the invention may benefit from a pressure below or equal to 5 mm Hg, e.g. 1-4 mm Hg. The temperature in the deodorizer may be varied as desired to optimize the yield and quality of the deodorized oil.

At higher temperatures, reactions which may degrade the quality of the oil will proceed more quickly. For example, at higher temperatures, cis-fatty acids may be converted into their less desirable trans form. Operating the deodorizer at lower temperatures may minimize the cis-to-trans conversion, but will generally take longer or require more stripping medium or lower pressure to remove the requisite percentage of volatile impurities. As such, deodorization is typically performed at a temperature in a range of 200 to 280° C., with temperatures of about 220-270° C. being useful for many oils (note: the temperatures reflect the temperatures reached by the oils in the deodorizer rather than, for example, that of the steam used during the process).

Typically, deodorization is thus occurring in a deodorizer whereby the deodorizer may have several configurations, such as horizontal vessels, vertical tray-type deodorizers to remove volatile components such as off-flavors and the thermal degradation of unwanted components. It is commonly known that at least one retention deodorizer tray is needed in a continuous or semi-continuous deodorizer to allow for the decomposition of hydroperoxides and for the removal of off-flavors. Typically the retention time is at least 30, or 60 minutes, up to 4 hours.

So far it is known in the art, for instance from WO2012/107230 or EP 3 321 348 that a second bleaching step is followed by a deodorization step applying a standard batch, continuous or semi-continuous deodorizer including at least one retention deodorizer tray. The presence of such retention trays allow removing hydroperoxides and/or volatile oxidation products, but it requires a long retention time, e.g. at least 30 minutes up to several hours.

The current process allows to avoid the second deodorization step and has replaced it with a further refining step d), described here below. This is resulting in shorter residence times and is having all the advantages that have been explained elsewhere. More particularly, the further refining step d) allows to avoid formation of process contaminants such as 2-MCPD esters, 3-MCPD esters, glycidyl esters, and mixtures of two or more thereof. It further allows to reduce the content of hydroperoxides and/or volatiles at low temperature and/or in a very short residence time. It has been demonstrated that in comparison with a second deodorization step, it needs a much shorter residence time (even up to 10-fold reduction) and the reduction of hydroperoxides and/or volatiles is obtained.

Further Refining Step (d).

The further refining step d) is carried out by passing the bleached edible oil obtained in step c) through an oil refining equipment consisting of a stripping column with packing and not more than one oil collection tray.

It has been found that the height to diameter ratio of the stripping column is from 0.1 to 10, from 0.5 to 5, from 1 to 4.9, from 1.4 to 4.7, from 1.4 to 4.5, from 1.5 to 4.4, from 1.5 to 4.3, from 1.5 to 4.2, from 1.6 to 4.0, from 1.6 to 3.0, from 1.7 to 2.8. Height to diameter ratios of 1.1, 1.2, 1.3, 1.8, 1.9, 2.0, 2.1, 2.2, 2.3, 2.4, 2.5, 2.6, 2.7, 2.9, 3.1, 3.2, 3.4, 3.5, 3.6, 3.7, 4.1 are likewise applicable. Alternatively, height to diameter ratios of 6, 7, 8 and 9 can be applied. In one aspect of the invention, the height to diameter ratio is from 0.1 to 10, from 0.5 to 5, from 1 to 4.9, from 1.4 to 4.7, from 1.4 to 4.5, from 1.5 to 4.4, from 1.5 to 4.3, from 1.5 to 4.2, from 1.6 to 4.0, from 1.6 to 3.0, from 1.7 to 2.8 with the proviso that the height is not 1 meter while the diameter is 200 millimetres.

The packing can be random packing or structured packing. Preferably the packing is a structured packing.

The term structured packing is well-known in the technical field and it refers to a range of specially designed materials for use in absorption and distillation columns Structured packings typically consist of thin corrugated metal plates arranged in a way that force fluids to take complicated paths through the column and thereby creating a large surface, which can enhance the interaction between oil and stripping agent.

The packing in the equipment of the present invention is having a specific surface of from 100 to 750 m$^2$/m$^3$, from 100 to 500 m$^2$/m$^3$, from 150 to 400 m$^2$/m$^3$, from 150 to 300 m$^2$/m$^3$, from 200 to 250 m$^2$/m$^3$.

Furthermore, the column has an oil loading of from 0.5 to 4.0 kg/m$^2$h surface of packing, from 0.5 to 3.5 kg/m$^2$h surface of packing, from 0.6 to 3.4 kg/m$^2$h surface of packing, from 0.7 to 3.3 kg/m$^2$h, from 0.8 to 3.2 kg/m$^2$h, from 0.9 to 3.1 kg/m$^2$h, from 1.0 to 3.0 kg/m$^2$h, from 1.5 to 2.8 kg/m$^2$h, from 2.0 to 2.5 kg/m$^2$h, preferably from 1.0 to 3.0 kg/m$^2$h surface of packing. An oil loading of 1.6, 2.2, 2.3, 2.4, or 2.5 kg/m$^2$h surface of packing is likewise applicable.

In a further aspect of the invention, the current process comprises a pre-heating step prior to step d).

In a further aspect of the invention, the current equipment allows for a short residence (retention) time. In particular, a total residence time in the refining equipment, including not more than one collection tray, and including the pre-heating (using the in-line heater of the bleached edible oil prior to passing the edible oil through the oil refining equipment used in step d)), is not more than 20 minutes, from 1 to 18 minutes, from 5 to 16 minutes, from 10 to 14 minutes. More in particular, the process of the present invention allows a residence time in the packing of the stripping column of from 1 to 10 minutes, from 1 to 9 minutes, from 2 to 8 minutes, from 3 to 7 minutes, from 4 to 6 minutes, from 1 to 5 minutes, from 1 to 3 minutes.

Residence times of 3.2, 3.3, 3.5 or 4.7 minutes in the stripping column are likewise applicable. Residence times of less than 7 minutes in the stripping column are likewise applicable, particular examples are residence times of less than 5 minutes, less than 4 minutes, not more than 3.5 minutes. Short residence times are further beneficial to avoid further formation of the process contaminants.

It is demonstrated that it is possible to reduce hydroperoxides and/or volatiles (acceptable to good taste) with a low load of oil (expressed as kg/m$^2$h surface of packing) and thus allowing for a suitable short residence time. It is to be understood that the residence time is affected by the type of packing, loading of oil, and dimensions of the column. Residence time can be increased or decreased by modifying one or more of these factors. The known-in-the art deodorizers are requiring longer residence times in the retention trays, which may have a negative effect on the further formation of the process contaminants.

In one aspect of the invention, the further refining step d) is carried out in a refining equipment that is consisting of a stripping column with packing and not more than one oil collection tray. There are no retention trays used. This will allow in step d) for a short residence time in the stripping column, and including the heating of the edible oil prior to passing the edible oil through the refining equipment as explained before. It will provide in a more efficient manner the refined edible oils with low glycidyl ester content and low primary and secondary oxidation products.

The stripping agent is steam or any other stripping gas, such as nitrogen gas. Preferably steam is used as stripping agent.

The stripping column is operated at an absolute pressure of below 8 mbar, from 0.1 to 8 mbar, from 0.5 to 7 mbar, from 1 to 6 mbar, from 1.5 to 5 mbar, 2 to 4 mbar.

It is recognized that bleached oil entering the stripping column of the refining equipment used in step d) is low in glycidyl esters. One wants to maintain these levels obtained in step c) low and wants to avoid the further formation of process contaminants such as 2-, 3-MCPD esters and mixtures thereof. Surprisingly, it was found that the stripping column as described in the present invention, can be used to reduce or remove the off-flavours and/or hydroperoxides and in particular in a very short residence time.

It is known that most of the off-flavor compounds in fats and oils are produced by the reaction of oxygen with unsaturated fatty acids in triacylglycerols or polar lipids. The reaction of unsaturated lipids with oxygen form hydroperoxides (also called primary oxidation products). These hydroperoxides are usually very unstable and break down into a wide variety of volatile flavor compounds (=volatile oxidation products), such as aldehydes and ketones (also known as the secondary oxidation products). These aldehydes are significant off-flavor compounds and are often responsible for the undesirable flavors, and/or smell in fats and oils.

This subsequent refining step d) is conducted such that no or only minor amounts of glycidyl esters are formed. In one aspect of the invention, the content of glycidyl esters is below LOQ (limit of quantification) measured according to Method DGF Standard Methods Section C (Fats) C-VI 18(10).

Alkali Treatment

In one aspect of the invention, the current process comprises a treatment in presence of a base. Alkali may be added during any existing process step and/or alternatively alkali may be added during any additional process step.

In one aspect of the invention, the treatment in presence of a base is prior to the further refining step d). The process according to the present invention may comprise the treatment in presence of a base prior to the re-bleaching step c).

Suitable sources of alkali may be selected from the group consisting of sodium hydroxide, potassium hydroxide, sodium carbonate, sodium bicarbonate, potassium carbonate, potassium bicarbonate, and/or soaps of fatty acids and mixtures of two or more thereof.

The treatment in presence of a base may involve alkali refining, alkaline interesterification or adding a base during any existing process step, such as prior to re-bleaching step, prior or during deodorization step, and/or alternatively alkali may be added during any additional process step.

More in particular, the treatment of base allows to reduce and/or remove the precursors of 2-MCPD esters, 3-MCPD esters and mixtures of two or more thereof.

Alkali Refining

According to one specific aspect of the invention, the treatment in presence of a base will consist of an alkali refining step comprising: (a) mixing a crude or partially refined oil with an aqueous alkali solution to produce a mixture of partially refined oil and soapstock; (b) separating off the soapstock (e.g. using a centrifuge or a settling tank); and (c) washing the partially refined oil (preferably with water at a temperature in the range 70-105° C.). The washed, partially refined oil can then be delivered to the next refining step (note: in the case of miscella, alkali refining will result in a neutralized, washed miscella which will first have to be subjected to evaporation before the oil can be delivered to the next refining step).

Alkalis which can be used for alkali refining will typically be strong alkalis such as sodium hydroxide or sodium carbonate. Sodium hydroxide, for instance, will preferably be used at a concentration of approximately 12 to 25%. This and other possible variations of the alkali refining step will be apparent to the person skilled in the art and need not, therefore, be described in detail here.

Without wishing to be bound by theory, it is thought that this alkali refining step will allow for removal of 3-MCPD ester and/or 2-MCPD ester precursors from the crude or partially refined oil, thus reducing the overall number of 3-MCPD esters, and/or 2-MCPD esters, formed during further processing (e.g. during deodorizing). As such, when used, this type of alkali treatment step will preferably be performed prior to the deodorization step, more preferably prior to the first bleaching step.

Alkali Interesterification

According to a further aspect of the present invention, the treatment in presence of a base may be an alkali interesterification step, performed by bringing a crude or partially refined oil into contact with an alkaline interesterification catalyst.

Interesterification is used to change the acyl-glycerol profile of an oil (in particular by exchanging fatty acids between different triglycerides). Again, without wishing to be bound by theory, it is thought that the alkali interesterification step allows for the removal of 3-MCPD esters and/or 2-MCPD esters themselves from a treated oil. As such, when used, the alkali interesterification step will preferably be performed after the deodorization step and, more preferably, prior to the re-bleaching step.

A number of alkaline interesterification catalysts are known in the art. These include, by way of example only, sodium alcoholates and potassium alcoholates such as sodium methoxide and/or sodium ethoxide; sodium stearate; sodium hydroxide and potassium hydroxide. Any of these may be used for the purposes of the present invention. According to one particular aspect of the invention, sodium methoxide is used, preferably at levels of approximately 0.05 to 0.1% by weight. Advantageously, the oil to be treated will be brought into contact with the alkaline interesterification catalyst under vacuum and at a temperature in the range of 80 to 120° C. Contact will preferably be maintained for 30 to 90 minutes. This will typically result in full interesterification of the oil although it should be noted that actual interesterification is not thought to be necessary to achieve reduced 2- and 3-MCPD ester levels.

Alkali Treatment in Any Other Process Step.

Alkali may be added during any existing process step such as prior to and/or during bleaching, prior to re-bleaching, prior to and/or during deodorization step and/or alternatively alkali may be added during any additional process step, preferably except during or after the further refining step d).

Suitable sources of alkali may be selected from the group consisting of sodium hydroxide, potassium hydroxide, sodium carbonate, sodium bicarbonate, potassium carbonate, potassium bicarbonate, and/or soaps of fatty acids and mixtures of two or more thereof.

According to one particular aspect of the invention, the process of the present invention may include multiple alkali treatment steps. For example, it may include an alkali refining type step prior to the deodorization and an alkali interesterification step subsequent to the deodorization. According to another aspect of the invention, the process may include an alkali refining step prior to the deodorization and addition of base during the deodorization. Other possible permutations will be apparent to a person skilled in the art.

Refined oils are oils that have undergone full refining and are suitable for use in their designated end application. In particular, they will be suitable for human consumption. Traditionally, refining has included at least a degumming step, a bleaching step and a deodorizing step, although other refining steps may also be used. A non-refined oil (i.e. an oil that has not been subjected to any refining steps) will be referred to as a crude or virgin oil. Such crude oils might be obtained by extraction with solvents (such as hexane) followed by evaporation of the solvent. The mixture of oil and solvent is called miscella but, for simplicity, will also be referred to herein as "crude oil". A partially refined oil is one that has been subjected to one or more refining steps but is not yet suitable for use in its end application. When the term "oil" is used alone, without prefix, it may refer to a non-, partially and/or fully refined oil, its meaning becoming apparent from context.

The oils may be derived from one or more vegetable and/or animal sources and may include oils and/or fats from a single origin or blends of two or more oils and/or fats from different sources or with different characteristics. They may be derived from standard oils or from specialty oils such as oils low in 2- and 3-MCPD (3-monochloropropane-1,2-diol) esters, from modified or unmodified oils and/or fats (i.e. from oils in their natural state or oils that have been subjected to a chemical or enzymatic modification or to fractionation) and so on. Preferably, they will be derived from vegetable oils or vegetable oil blends. Examples of suitable vegetable oils include: soybean oil, corn oil, cottonseed oil, palm oil, palm kernel oil, peanut oil, rapeseed oil, safflower oil, sunflower oil, sesame seed oil, rice bran oil, coconut oil, canola oil and any fractions or derivatives thereof, preferably palm oil. Palm oil is encompassing palm oil, as well as palm oil fractions such as stearin and olein fractions (single as well as double fractionated, and palm mid fractions) and blends of palm oil and/or its fractions.

Finally, the current invention relates to the use of refining equipment consisting of a stripping column with packing and not more than one oil collection tray to reduce the content of hydroperoxides and/or volatiles from refined bleached, deodorized and re-bleached edible oils. It relates to the use for degrading, decomposing or breaking down oxidation products of triglycerides, diglycerides, monoglycerides and/or fatty acids from refined bleached, deodorized and re-bleached edible oils.

The current invention relates to the use of refining equipment consisting of a stripping column with packing and not more than one oil collection tray to obtain refined oils with flavour quality (taste) score of at least 7, at least 8, at least 9 according to AOCS method Cg 2-83.

It is known that according to existing art, deodorizers with at least one retention tray are needed to obtain good quality of edible oils. Surprisingly, the current invention has demonstrated that the use in step d) of refining equipment consisting of a stripping column with packing and not more than one oil collection tray allows obtaining equally good or better quality than the oils obtained in the batch, continuous or semi-continuous deodorizer with at least one retention tray. The advantages of the use of the refining equipment consisting of a stripping column with packing and not more than one oil collection tray have been outlined elsewhere. It further includes amongst others the simplicity of the equipment, low investment costs and ease of operation, and the ability to have a quick throughput (due to e.g. short residence times and low risk of comingling).

Furthermore, it relates to the use wherein the stripping column is having an oil loading of from 0.5 to 4.0 $kg/m^2 h$ surface of packing.

Furthermore, the column has an oil loading of from 0.5 to 3.5 kg/m²h surface of packing, from 0.6 to 3.4 kg/m²h surface of packing, from 0.7 to 3.3 kg/m²h, from 0.8 to 3.2 kg/m²h, from 0.9 to 3.1 kg/m²h, from 1.0 to 3.0 kg/m²h, from 1.5 to 2.8 kg/m²h, from 2.0 to 2.5 kg/m²h, preferably from 1.0 to 3.0 kg/m²h. An oil loading of 1.6, 2.2, 2.3, or 2.4 or 2.5 kg/m²h surface of packing is likewise applicable.

It further relates to the use wherein the stripping column has a height to diameter ratio from 0.1 to 10.

It further relates to the use wherein the height to diameter ratio of the stripping column is from 0.1 to 10, from 0.5 to 5, from 1 to 4.9, from 1.4 to 4.7, from 1.4 to 4.5, from 1.5 to 4.4, from 1.5 to 4.3, from 1.5 to 4.2, from 1.6 to 4.0, from 1.6 to 3.0, from 1.7 to 2.8. Height to diameter ratios of 1.1, 1.2, 1.3, 1.8, 1.9, 2.0, 2.1, 2.2, 2.3, 2.4, 2.5, 2.6, 2.7, 2.9, 3.1, 3.2, 3.4, 3.5, 3.6, 3.7, 4.1 are likewise applicable. Alternatively, height to diameter ratios of 6, 7, 8 and 9 can be applied.

In one aspect of the invention, the height to diameter ratio is from 0.1 to 10, from 0.5 to 5, from 1 to 4.9, from 1.4 to 4.7, from 1.4 to 4.5, from 1.5 to 4.4, from 1.5 to 4.3, from 1.5 to 4.2, from 1.6 to 4.0, from 1.6 to 3.0, from 1.7 to 2.8 with the proviso that the height is not 1 meter while the diameter is 200 millimetres.

The current invention has demonstrated that the post-refining step (final mild refining) of the re-bleaching step c) and the further refining step d) are essential steps to obtain a refined oil with good taste and low in 2-,3-MCPD esters and glycidyl esters content. It is shown that after the re-bleaching step c), which is used to further reduce the content of glycidyl esters (GE), the refined oil is not acceptable in taste and it has a high peroxide value, expressed in meq/kg.

A subsequent deodorization step in a standard deodorizer comprising retention trays is known in the art to improve taste of these refined oils and it requires residence times of more than 25 minutes, more than 30 minutes or more, up to several hours. Only by keeping the temperature below 200° C. the increase of the content of process contaminants (such as 2-, 3-MCPD esters, GE) can be kept low.

Surprisingly, it was found that by substituting such a standard deodorization step with the refining step d) using a stripping column as described before, a refined oil with low 2-, 3-MCPD esters and glycidyl esters content and an acceptable to good taste was obtained. Up till now it was expected that the deodorizer with retention trays and the longer retention times were needed to be able to reduce the content of hydroperoxides and/or volatiles. Alternatively, special quenching processes using cooled oil have been used to match the taste quality of deodorized oil. The current invention has demonstrated that the short residence times in the stripping column are sufficient to reduce the content of hydroperoxides and/or volatiles and the increase of the content of process contaminants is kept low. More in particular, using a stripping column having an oil loading of from 0.5 to 4.0 kg/m²h surface of packing is demonstrated to be beneficial. The further advantages of the refining equipment used in step d) are likewise here applicable, such as what has been described before in respect of e.g. the simplified equipment and the short residence time in the stripping column.

The current invention provides chemically or physically refined oils, preferably palm oils with good, bland taste and low in process contaminants selected from 3-MCPD esters, glycidyl esters and mixtures of two or more thereof.

The current invention is illustrated by the following non-limiting examples.

Analytical Methods

The oils were tasted and evaluated for their flavor quality (taste). A flavor quality score was given according to AOCS method Cg 2-83, where a flavour quality score of 10 is an excellent quality and a flavour quality score of 1 is the worst.

Peroxide value (PV) is measured according to AOCS method Cd 8b-90.

Oxidation Stability Index (OSI) is measured according to AOCS method Cd12b-92.

EXAMPLES

Comparative Example 1

Caustic refined, bleached and deodorized Palm oil (1) (=chemically refined Palm oil) was treated in a re-bleaching step wherein the oil was contacted during 30 min with 0.2% (w/w) of acid-activated bleaching clay (Taiko Classic) at a pressure of 200 mbar and at a temperature of 100° C. A sample was taken for analysis (2). The rebleaching was followed by a post-deodorization step. Post-deodorization was carried out in a semi-continuous tray-type deodorizer at 180° C. with 0.8% (w/w) sparge steam at a pressure of 5.0 mbar and a retention time of 30 minutes, resulting in refined palm oil (3).

3-MCPD-esters (3-MCPD), glycidyl-esters (GE) and PV were analyzed, as well as the taste and oxidative stability.

| Example 1 | Chemically refined palm oil (1) | Chemically refined palm oil after re-bleaching step (2) | Chemically refined palm oil after re-bleaching step and post-deodorization step (3) |
|---|---|---|---|
| 3-MCPD | 1.04 ppm | 1.01 ppm | 1.07 ppm |
| GE | 1.11 ppm | 0.05 ppm | 0.09 ppm |
| PV | 0.08 meq/kg | 0.32 meq/kg | 0.06 meq/kg |
| Taste | 8.0 | 6.0 | 8.0 |
| OSI (at 120° C.) | not analyzed | not analyzed | 14 hours |

A residence time of 30 minutes was needed to obtain a refined oil with acceptable taste.

Example 2

Caustic refined, bleached and deodorized Palm oil (1) (=chemically refined Palm oil) was treated in a re-bleaching step wherein the oil was contacted during 30 min with 0;2% (w/w) of acid-activated bleaching clay (Taiko Classic) at a pressure of 200 mbar and at a temperature of 100° C. A sample was taken for analysis (2). The re-bleaching was following by a further refining step (d) using a stripping column with a structured packing with 3.04 m² area at an oil loading of 7.2 kg/m²h surface of packing, at a pressure of 5;0 mbar and at an oil temperature of 181° C. 0.3% (w/w) Stripping steam was contacted in counter-current with the oil that was running top-down over the structured packing. The oil retention time in the stripping column was 1.1 minutes, resulting in refined palm oil (3).

3-MCPD, GE and PV were analyzed, as well as the taste and oxidative stability.

| Example 2 | Chemically refined palm oil (1) | Chemically refined Palm oil after re-bleaching step (2) | Chemically refined Palm oil after re-bleaching step and stripping column (3) |
|---|---|---|---|
| 3-MCPD | 0.87 ppm | 0.81 ppm | 0.83 ppm |
| GE | 1.28 ppm | 0.07 ppm | 0.08 ppm |
| PV | 0.07 meq/kg | 0.29 meq/kg | 0.26 meq/kg |
| Taste | 8.0 | 6.0 | 7.0 |

The use of the stripping column with oil loading of 7.2 kg/m$^2$h surface of packing has improved the taste of the re-bleached oil, and refined palm oil (3) had still a slight rancid taste.

Example 3

Caustic refined, bleached and deodorized Palm oil (1) (=chemically refined Palm oil) was treated in a re-bleaching step wherein the oil was contacted during 30 min with 0.2% (w/w) of acid-activated bleaching clay (Taiko Classic) at a pressure of 200 mbar and temperature of 100° C. A sample was taken for analysis (2). The re-bleaching was following by a further refining step (d) using a stripping column with a structured packing with 9.12 m$^2$ area at an oil loading of 2.4 kg/m$^2$h surface of packing, at a pressure of 5.1 mbar and an oil temperature of 180° C. Stripping steam, 0.3% (w/w), was contacted in counter-current with the oil that was running top-down over the structured packing. The oil retention time in the stripping column was 3.3 minutes, resulting in refined palm oil (3).

3-MCPD, GE, PV and taste were analyzed for the start oil (1) and of the oil after post-bleaching (2) and the oil (3) obtained after using the stripping column.

| Example 3 | Chemically refined palm oil (1) | Chemically refined Palm oil after re-bleaching step (2) | Chemically refined Palm oil after re-bleaching step and stripping column (3) |
|---|---|---|---|
| 3-MCPD | 0.94 ppm | 0.91 ppm | 0.96 ppm |
| GE | 1.05 ppm | 0.04 ppm | 0.05 ppm |
| PV | 0.05 meq/kg | 0.24 meq/kg | 0.08 meq/kg |
| Taste | 8.0 | 6.0 | 9.0 |
| OSI (at 120° C.) | not analyzed | not analyzed | 14 hours |

The use of the stripping column with oil loading of 2.4 kg/m$^2$h surface of packing has significantly improved the unacceptable taste of the re-bleached oil, and the obtained refined palm oil (3) has a bland, good taste Example 4

Physically refined Palm oil (1) was treated in a re-bleaching step wherein the oil was contacted during 30 min with 0.2% (w/w) of acid-activated bleaching clay (Taiko Classic) at a pressure of 200 mbar and at a temperature of 100° C. A sample was taken for analysis (2). The re-bleaching was following by a refining step using a stripping column with a structured packing with 9.12 m$^2$ area at an oil loading of 2.4 kg/m$^2$h surface of packing at a pressure of 5.3 mbar and temperature of 180° C. Stripping steam 0.3% (w/w) was contacted in counter-current with the oil that was running top-down over the structured packing. The oil retention time in the stripping column was 3.3 minutes, resulting in refined palm oil (3).

3-MCPD, GE, PV and taste were analyzed for the start oil (1) and of the oil after post-bleaching (2) and the oil (3) obtained after using the stripping column.

| Example 4 | Physically refined palm oil (1) | Physically refined Palm oil after re-bleaching step (2) | Physically refined Palm oil after re-bleaching step and stripping column (3) |
|---|---|---|---|
| 3-MCPD | 3.69 ppm | 3.66 ppm | 3.79 ppm |
| GE | 10.98 ppm | 0.17 ppm | 0.19 ppm |
| PV | 0.05 meq/kg | 0.25 meq/kg | 0.09 meq/kg |
| Taste | 8.0 | 6.0 | 9.0 |
| OSI (at 120° C.) | not analyzed | not analyzed | 15 hours |

The use of the stripping column with oil loading of 2.4 kg/m$^2$h surface of packing has significantly improved the unacceptable taste of the re-bleached oil, and the obtained refined palm oil (3) has a bland, good taste

The invention claimed is:

1. A process for the production of a refined oil having a reduced content of glycidyl ester and hydroperoxides characterized in that it comprises subjecting an edible oil to the following steps:
   a) a bleaching step,
   b) a deodorization step,
   c) a re-bleaching step of the deodorized oil, and
   d) a further refining step, wherein the further refining step d) is carried out by passing the bleached edible oil obtained in step c) under vacuum through an oil refining equipment consisting of a stripping column with packing and not more than one oil collection tray and carried out a temperature below 215° C.;
   wherein the stripping column has a packing and an oil loading of from 0.5 to 4.0 kg/m$^2$h surface of packing; and
   wherein the refined oil has a reduced content of glycidyl ester and hydroperoxides.

2. The process according to claim 1 wherein the stripping column has a height to diameter ratio from 0.1 to 10.

3. The process according to claim 1 wherein the bleaching step a) and/or c) is performed in presence of an activated bleaching agent.

4. The process according to claim 1 wherein the process further comprises a treatment in presence of a base.

5. The process according to claim 4 wherein the treatment in presence of a base is prior to the further refining step d).

6. The process according to claim 4 wherein the treatment in presence of a base is prior to the re-bleaching step c).

7. A method for using a refining equipment consisting of a stripping column with packing and not more than one oil collection tray, the method comprising:
   passing a refined bleached, deodorized, and re-bleached edible oil under vacuum through the refining equipment carried out a temperature below 215° C.;
   wherein the stripping column has an oil loading of from 0.5 to 4.0 kg/m$^2$h surface of packing; and
   wherein the method reduces the content of hydroperoxides and/or volatiles from the refined bleached, deodorized, and re-bleached edible oil.

8. The method according to claim 6, wherein the stripping column has a height to diameter ratio from 0.1 to 10.

9. The process of claim 5, wherein the bleached edible oil obtained in step c) has a total residence time in the stripping column of not more than 20 minutes.

10. The process of claim 5, wherein steam is used as a stripping agent.

11. The process of claim 5, wherein the stripping column is operated at an absolute pressure from 0.1 to 8 mbar.

12. The process of claim 5, wherein the obtained refined edible oil has a flavour quality score of at least 8.

13. The process of claim 5, wherein the packing is a structured packing.

14. The method of claim 7, wherein the refined bleached, deodorized, and re-bleached edible oil has a total residence time in the stripping column of not more than 20 minutes.

15. The method of claim 7, wherein steam is used as a stripping agent.

16. The method of claim 7, wherein the stripping column is operated at an absolute pressure from 0.1 to 8 mbar.

17. The method of claim 7, wherein after passing the refined bleached, deodorized, and re-bleached edible oil through the refining equipment, the refined bleached, deodorized, and re-bleached edible oil has a flavour quality score of at least 8.

18. The method of claim 7, wherein the packing is a structured packing.

\* \* \* \* \*